United States Patent [19]
Klass et al.

[11] 3,797,200
[45] Mar. 19, 1974

[54] SEPARATION OF METHANE AND NITROGEN MIXTURES UNDER NON-STEADYSTATE CONDITIONS

[75] Inventors: Donald L. Klass, Barrington; Carl D. Landahl, Chicago, both of Ill.

[73] Assignee: Northern Natural Gas Company, Omaha, Nebr.

[22] Filed: Feb. 12, 1973

[21] Appl. No.: 331,828

Related U.S. Application Data

[63] Continuation-in-part of Ser. No. 135,124, April 20, 1971, abandoned.

[52] U.S. Cl. .................................................. 55/16
[51] Int. Cl. ............................................. B01d 53/22
[58] Field of Search ............................... 55/16, 158

[56] References Cited
UNITED STATES PATENTS
3,616,607 11/1971 Klass et al. .................................. 55/16
3,398,504 8/1968 Rubin ......................................... 55/16

*Primary Examiner*—Charles N. Hart

[57] ABSTRACT

A gas mixture of methane and nitrogen is separated into enriched components under non-steady state conditions wherein nitrogen in the mixture is picked up more favorably by a membrane which is a homopolymer of acrylonitrile, such nitrogen being picked up before the concentration composition of the permeated or absorbed gases reach substantially constant levels.

5 Claims, 5 Drawing Figures

PATENTED MAR 19 1974 3,797,200
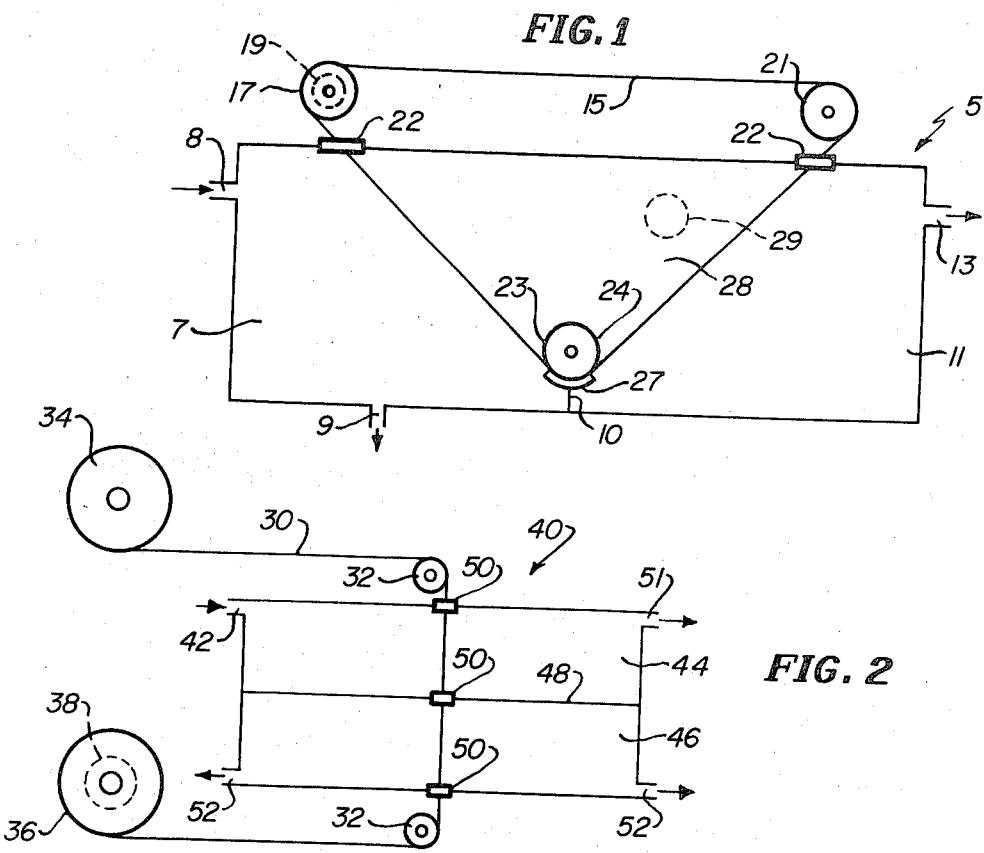
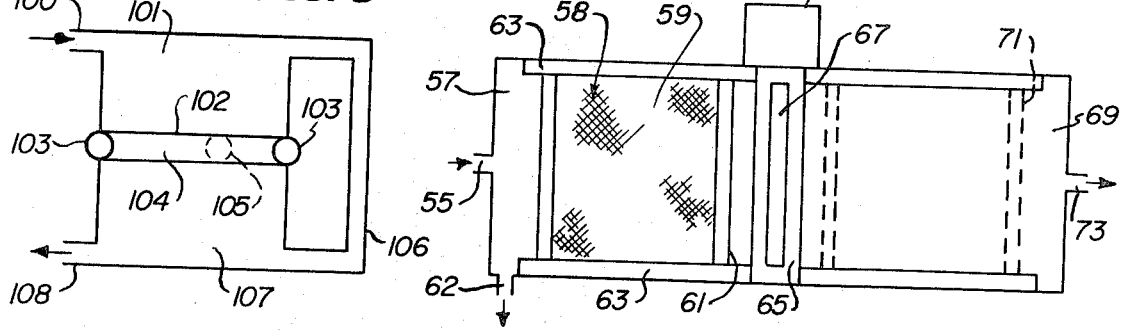
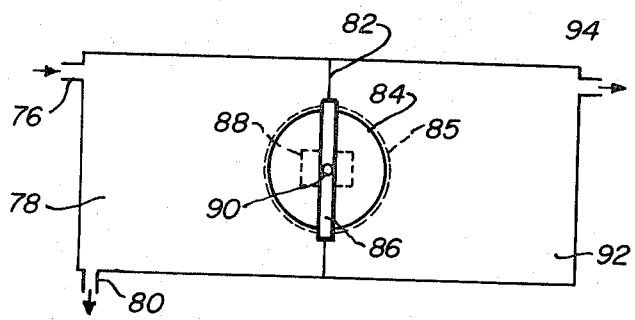
INVENTORS
Donald Leroy Klass
Carl David Landahl
BY
Dominik, Knechtel & Godula
ATTYS.

SEPARATION OF METHANE AND NITROGEN MIXTURES UNDER NON-STEADYSTATE CONDITIONS

This application is a continuation-in-part of full pending application Ser. No. 135,124 filed Apr. 19, 1971 and now abandoned.

This invention relates to a method for separating a nitrogen-methane gas mixture into separate, enriched fractions, by utilizing a particular gas permeable membrane under non-steady state conditions. In one form the invention particularly relates to a method for obtaining such enriched fractions by moving a specific gas permeable membrane which is a homopolymer of polyacrylonitrile from a sorption zone to a desorption zone at controlled velocities. The high permeability nitrogen is preferentially picked up in the sorption zone and released in the desorption zone.

The art has come to recognize the utility of employing gas permeable membrances for separating components in a gas mixture. According to prevailing views, permeability of a gas through a membrane is characterized by two features, solubility of the gas in the membrane material and diffusion of the gas through a membrane. Permeation of any single gas has therefore been viewed as being the product of the solubility and diffusivity of a given gas in the membrane. The rate of permeation of a gas is further influenced by variables such as membrane thickness, nature of the membrane, layers of the membrane involved, differential pressures, temperatures, and possibly still other factors. Such features of membrane technology are recognized in the art, and it is further recognized how such variables may be considered to evaluate the performance of a particular gas and a particular membrane.

Placing gas permeable membranes between separating zones or areas is known for batch separation, or the like, of the gas components. A feed gas mixture is introduced in the zone to one side of the membrane so that high permeability gas components permeate the membrane and pass into the zone on the other side of the membrane. The rejected or non-permeated gas in the first zone may then be drawn off continuously and collected by conventional means. The gas which has completed permeation into the second zone may be drawn off continually by conventional means. When the concentration composition of the gas in the second zone no longer changes with time, a steady state condition prevails.

One representative teaching of separating gas components by employing such membranes is disclosed in U.S. Pat. No. 3,172,741. An improved application of that teaching is disclosed and claimed by the present applications in copending U.S. Ser. No. 26,129 filed Apr. 6, 1970, now U.S. Pat. No. 3,616,607 title whereof is also held by the present assignee. In said copending serial application Ser. No. 26,129 the particular problems of separating methane and nitrogen is met by applying a particularly successful and adaptable membrane which is a homopolymer of polyacrylonitrile. The important feature of the present invention is the recognition that separation of methane and nitrogen through the particular homopolymer of polyacrylonitrile membrane can be practiced to advantage by utilizing a non-steady state of the gas permeable membrane, rather than employing the batch system as disclosed in said copending U.S. patent application Ser. No. 26,129. Such a recognition has resulted in the present invention which utilizes a non-steady state of the gas permeable membrane to improve the efficiency of obtaining enriched nitrogen components from a gas mixture of methane and nitrogen, relative to known batch or steady state systems where the composition of the gas attains steady levels.

It is accordingly one important object of the present invention to provide a method for an improved separation of methane and nitrogen from a mixture of these two components by providing a non-steady state for a homopolymer of polyacrylonitrile membrane to facilitate separation of these gas components.

It is still another important object of the present invention to provide a method, of the type described, whereby the identified membrane is moved at selected and variable velocities along adjoining zones to attain efficient pickup of the higher permeability nitrogen from a mixture in one place, and to provide efficient release of said carried nitrogen gas in another place.

Still yet another important object of the present invention is to provide a method wherein the identified gas permeable membrane may be moved in different ways at selected variable or constant velocities along a first zone where a high permeability nitrogen for that membrane is picked up, and in a second zone where the nitrogen is discharged for collection.

Still yet another important object of the present invention is to provide a method wherein homopolymer of polyacrylonitrile membrane is used to efficiently separate a methane and nitrogen containing gas mixture under non-steady state conditions, said identified membrane being used alone as a thin membrane, or in association with a membrane assembly.

The foregoing objects are attained together with still other objects which occur to practitioners from time to time when considering the invention of the following disclosure.

The foregoing copending serial application Ser. No. 26,129 has disclosed how separation or upgrading of a methane-nitrogen mixture can be attained to modest levels of success with various membranes, but that a markedly successful operation is attained with a homopolymer of acrylonitrile membrane. Such a membrane is uniquely adapted for successful separation because nitrogen permeates through such a membrane at high rates relative to methane.

Such polyacrylonitrile membranes have been described in U.S. Pat. No. 3,172,741. The highly operable membrane materials have been found to essentially consist of homopolymers of acrylonitrile, and such membrane materials are available under the trade designation Vistron 331 from the Vistron Corporation, subsidiary of Sohio. A true homopolymer of acrylonitrile may be prepared by the method disclosed in abandoned U.S. Pat. application Ser. No. 740,149, identified in issued U.S. Pat. No. 3,172,741.

The copending application Ser. No. 26,129 also recognizes that biaxial orientation of the homopolymer of acrylonitrile is not required for efficient separation of methane-nitrogen, contrary to the assertions in said U.S. Pat. No. 3,172,741. High nitrogen and methane separation factors are attained with acrylonitrile homopolymers which are not biaxially oriented.

A further feature of said copending application Ser. No. 26,129 is that very thin layers of polyacrylonitrile membranes are of importance in separation; particularly, it was required that the very thin layer be a homopolymer of acrylonitrile. In general, the term "thin layer" is intended to represent layers having a thickness not greater than about 0.05 mils. Successful operation may be obtained with a polyacrylonitrile membrane having a thicker dimension, say, up to about 10 mils, but it is preferred to employ the thin layer on a support or in combination with other polymeric membranes, as further described in said copending application.

Such copending application further disclosed how different structural forms of the homopolymer of acrylonitrile could be employed alone or in combination with other polymeric membranes. That copending application referred to the state of the art, and described how bilayers could be formed, at least one of which is a homopolymer of acrylonitrile.

According to the present invention, the homopolymer of polyacrylonitrile membrane, or membrane system employing such an identified membrane, is moved or exposed for a selected time period in a sorption zone where the methane-nitrogen feed mixture is introduced. The known steady state system provides that a particular membrane will adsorb or permeate a particular concentration composition of a gas mixture of methane and nitrogen at a certain time which is then unchanged. These are the steady state levels. In accordance with the present invention, the concentrations of the composition of methane and nitrogen is recorded over a time period prior to attainment of such a steady state. This non-steady state occurs because of relative movement between the membrane and the gas mixture of methane and nitrogen prior to steady state adsorption or permeation. This relative movement can be attained in various ways, for example, pulsing a gas mixture so separate charges are delivered to a membrane and determining the amount of gas adsorbed or permeated after one charge, and after successive charges until a steady state is reached. Readings can be obtained from a given membrane after, say, one, three, five, and nine charges, assuming a steady state after nine charges. The determination for the steady state is, therefore, made after nine successive charges.

In a similar way, a homopolymer of a polyacrylonitrile membrane may be saturated with a gas mixture of methane and nitrogen, and such membrane deposited in the chamber which is depressurized so that a first charge is desorbed at a first time interval. The desorbed gas is collected and a succeeding charge is desorbed at a second time interval and collected. This is continued until all of the adsorbed gas mixture is desorbed. This is a reverse way of reaching the steady state values which correspond to the homopolymer of polyacrylonitrile membrane originally saturated with the gas mixture of methane and nitrogen.

Another way is the presently contemplated preferred embodiment of moving a membrane through a sorption zone and the following desorption zone. Changing the velocity represents altering the adsorption or permeation rates. At such conditions, the concentration composition of the carried gas mixture of methane and nitrogen will be dependent upon the velocity.

In all of the above procedures, an improved separation is realized because gas is preferentially picked up during the relative movement under non-steady state conditions. To further illustrate the differences in these two processes, consideration may be given to a gas mixture A and B having diffusion coefficients $D_A$ and $D_B$, and solubility coefficients $S_A$ and $S_B$ in membrane X. The permeability constants for gases A and B are then given by:

$P_A = D_A S_A$ and $P_B = D_B S_B$

The separation factors for gas A with respect to gas B is given by:

$A/B = P_A/P_B = D_A S_A/D_B S_B$

These parameters are measured by conventional techniques. Depending on the properties of the gas-membrane combination, the separation factor ranges from less than 1.0 to more than 1.0. Particular values provide one skilled in the art with the expected compositions of the permeated gas under steady state conditions. For the case where gas A and gas B have equal permeabilities for membrane X, permeation of gas mixture A-B through membrane X affords the same gas mixture A-B without enrichment of either component at the steady state condition. Any result which deviates from this occurs under a non-steady state condition.

The present method is directed primarily to separating methane and nitrogen from a mixture comprising essentially these two components. It is understood, however, that other gas components may be present in the mixture from which the particular components of methane and nitrogen are separated and enriched. The methane and nitrogen may be present in various proportions up to about 50—50 relative to each other. In many instances, one of the components may comprise a minor proportion, particularly nitrogen. Nitrogen is known to be present in minor proportions of about 13 volume percent in one available natural source of nitrogen and methane mixture. It is also intended to separate only trace amounts of the components which may be present as less than 2 percent of the mixture. The trace amounts may be desirably separated because they may constitute a contaminant, for example.

Use of the term "adsorbed" may be viewed as meaning that the adsorbed gas is collected on the membrane or permeates the membrane, either partially or completely. Such permeation may be considered a product of the solubility and diffusivity of either methane or nitrogen in the homopolymer of polyacrylonitrile. It is understood that both adsorption and permeation through the membrane may occur. The term "collection" is intended to represent obtaining an enriched component, whether rejected or adsorbed. Reference to collecting a "permeated" component is intended to refer to a component adsorbed on the membrane, permeated into the membrane, or permeated through the membrane.

The steps of the adsorption and desorption may occur on the same side of the polyacrylonitile membrane system as it moves through the respective zones. There also may be present a "through membrane" desorption following permeation of the nitrogen component to the other side of the homopolymer of polyacrylonitrile membrane. In such a case, a desorption zone is present, adjacent the moving membrane. In the event desorption occurs only on one side of the membrane, then it is desirable to provide large surface areas of the homopolymer of polyacrylonitrile to permit more efficient adsorption and desorption. Maximal surface areas will be provided, in such a case, in accordance with accommodations of a particular apparatus assembly.

Various ancillary features may be provided to enhance the functions of adsorption and desorption. For example, compression means, such as rollers, may be used against the membrane to facilitate collection of the gas at the desorption zone. Negative pressures may be provided in the sorption zone to facilitate adsorption by the mixture introduced under positive pressure.

The gas permeable membrane system may take various forms in its movement between the sorption and desorption zones. Such forms may include an endless belt, a rotating disc or sheet, a reciprocating bed-type membrane, or the like. It is intended that the desorption step may occur in one desorption zone or in a series of adjoining desorption zones to attain multiple diffusion in stages. In general, it is preferred that adsorption occurs in one zone or area and desorption occurs in one or more adjoining zones or areas. The method and apparatus is susceptible to upgrading methane and nitrogen components by the batch method, a continuous method or a semi-continuous method. This will be further appreciated by consideration of the description in association with the drawings. It is also intended that the rejected gas in the sorption zone may be recycled to the same or to another adsorption zone for further preferential adsorption of the high permeability gas component. Such recycling will even further upgrade the rejected gas component. It is also intended that the carried gas which has completed permeation in the desorption zone may be recycled to further upgrade such carried gas in the same or another adsorption zone.

It is an essential feature of the present invention that the movement of the gas permeable membrane is controlled to permit as high a separation as possible of nitrogen by the membrane by utilizing the high nitrogen permeability thereof. This function will also be referred to as "preferential adsorption". This will be determined by practitioners after considering the parameters of particular gas permeable membrane systems and the identity of the gas components in the mixture. Particular speeds will lead to high amounts of adsorption in a given set of conditions, and this can be ascertained by noting the amount of component which has been adsorbed and later collected. The flow rate of the high permeability gas through a particular membrane may be ascertained by determing the permeability constant K for a particular membrane system and permeate in accordance with methods such as the solubility-diffusivity or constant volume-constant pressure method, both described in the previous copending application, Ser. No. 26,192. Knowing this permeability constant and other parameters, the flow rate may be determined in accordance with recognized procedures and mathematical relationships. The permeabilities or flow rates of two gases in a mixture may then be considered as a ratio to obtain expressions of separation. It will be appreciated that for a given gas mixture, membrane systems will be selected which provide higher separation.

The following Example is presented to illustrate the practice of the invention, but it should be understood that such an Example is to be considered only an illustrative embodiment and not an exclusive embodiment.

EXAMPLE 1

Separation of Methane and Nitrogen by Non-Steady State Desorption of Steady State Saturated Membrane A polyacrylonitile membrane was saturated with a mixture of 18 percent nitrogen and 82 percent methane. The total amount of gas mixture that could be adsorbed by the membrane was adsorbed, therefore, the composition of the adsorbed mixture had reached a steady-state wherein the components of the mixture were unchanged in the membrane. The saturated membrane was placed in a gas tight chamber, the pressure within the chamber was reduced to allow a first sample of gas to desorb from the membrane. At a given time, the desorbed gas was collected to evacuate the chamber of the gas samples. The pressure was again reduced and a second sample was desorbed and collected at a second time period. This procedure was repeated until no further gas was obtained. Before the permeated gas is depleted the compositions of the permeated or desorbed gases at different times are determined to establish separation factors under non-steady state conditions. This example is similar to one where the permeated or desorbed gas samples would be alternatively collected by moving the membrane into separate receivers as a function of time. The data obtained under the foregoing non-steady state separation was compared with steady-state separation data obtained by delivering a feed mixture at constant pressure to one side of a membrane of the same type and thickness, and determining the separation when the permeated gas on the other side of the membrane reached a substantially constant composition.

TABLE 1

|  | Steady-State | | Non-Steady-State | |
| --- | --- | --- | --- | --- |
|  | $N_2$ | $CH_4$ | $N_2$ | $CH_4$ |
| Feed Gas Composition, % | 18 | 82 | 18 | 82 |
| Pressure, cm Hg | 285 | | 2950 | |
| Permeated Gas Composition, % | 68 | 32 | 85 | 15 |
| Time elapsed, hr | — | | 0.2 | |
| Ratio, $N_2$:$CH_4$ | 2.1 | | 6 | |
| Separation Factor $N_2$/$CH_4$ | 10 | | 26 | |

*At ambient temperature
Based on data extrapolated to evacuation time, average composition during specified time interval, Data Book G2069, p. 13.

It is seen from foregoing Table 1 that the initial period exhibits an extremely high nitrogen to methane separation factor in the non-steady state. This early high nitrogen separation is utilized to advantage by separately collecting such early permeated nitrogen context from subsequently permeated gas mixtures which contain greater amounts of methane.

The separation factor is an expression obtained from:

$$\frac{\text{Percent N in permeated gas} \times \text{percent } CH_4 \text{ in feed gas}}{\text{Percent } CH_4 \text{ in permeated gas} \times \text{percent N in feed gas}}$$

For a further understanding of the invention, reference will not be made to the following highly diagrammatic drawings, wherein FIG. 1 is a diagrammatic representation of a gas separation enclosure wherein the gas permeable membrane system moves as an endless or continuous run;

FIG. 2 is a diagrammatic representation of an alternative embodiment wherein the gas permeable membrane system is fed from a supply source and taken up by collecting source, both sources positioned outside the gas separating enclosure;

FIG. 3 is a diagrammatic representation of an alternative embodiment wherein the gas permeable membrane system is shuttled reciprocally between adjoining sorption and desorption zones;

FIG. 4 is a diagrammatic representation of an alternative embodiment wherein the gas permeable membrane system is a rotatable member mounted between adjoining sorption and desorption zones; and FIG. 5 is a diagrammatic representation of an alternative embodiment wherein the adsorbed gas may permeate through a membrane into an adjoining desorption zone.

The gas separating enclosure 5 of FIG. 1 has an enclosed sorption zone 7 provided with a feed gas mixture inlet 8 and a rejected gas component outlet 9. A support or wall 10 partly separates the sorption zone 7 from the adjoining enclosed desorption zone 11. The desorption zone is provided with a gas discharge 13 through which the released or desorbed gas component passes for collection into means not shown.

The gas permeable membrane system is shown as a continuous or endless membrane film or belt, 15. The membrane film is driven by a variable speed driving roller 17 which may be actuated by a motor assembly indicated at 19. The membrane film turns around an idler roller 21 outside the separating enclosure, and said film is shown passing through passageway plugs or seals 22. Such plugs may have close tolerance passageways to allow movement of the membrane film, but to counteract substantial escape of gases within the enclosed zone. The membrane film also turns around a transitional zone roller 23 which rotates around shaft 24 that may be variously mounted to the chamber. A close tolerance arcuate bearing member 27 is shown positioned below the roller so the membrane film may pass therebetween.

The motor and control means 19 move the membrane film 15 at a predetermined velocity so that the run of the film 15 within the sorption zone 7 is desirably saturated with a high permeability gas component in the mixture present herein. The same or variable speed is employed so that the run of film moving through the desorption zone 11 permits completion of desorption or escape of the carried gas component. Any carried gas component which permeates through the film 15 may be collected through discharge 29 in an ancillary desorption zone 28 formed by the run of the film and the walls of the gas separating enclosure 5. Means such as the illustrated sealing plugs may be used in the walls to assure separation of the respective zones. Whether desorption or through permeation occurs alone or together will depend on the thickness of the film used and other characteristics of the gas-film relationship, for example, permeation.

If it is desired that a run of membrane film be not recycled following desorption, an embodiment such as that shown in FIG. 2 may be employed. The membrane run 30 is shown turning about idler rollers 32, both positioned outside the sorption and desorption zones. The membrane run 30 goes from a supply or feed roller, and is taken up by a collecting source or uptake roll 36, both also positioned outside sorption and desorption zones. The uptake roll is shown as having a variable speed motor 38 mounted thereto to control the velocity of the membrane run through the respective sorption and desorption zones.

The gas separating enclosure 40 is provided with a feed gas mixture inlet 42 leading to sorption zone 44. An underlying desorption zone 46 is separated from the sorption zone by a zone divider or wall 48. Close tolerance passageway plugs or seals 50 are provided in the path of the membrane run. An outlet 51 for the rejected gas component is provided in the sorption zone, said rejected gas moving around opposite sides of the film, which has a width less than that of the sorption zone. Discharges 52 are provided in the desorption zone, through which the carried or permeated gas passes for collection.

A reciprocating gas membrane system is illustrated in the view of FIG. 3. The gas separating enclosure is provided with a feed gas mixture inlet 55 which admits the gas into a sorption zone 57. The gas permeable membrane system 58 is shown as comprising a membrane sheet 59 held in a support frame 61. The membrane system 58 adsorbs the high permeability gas component in the sorption zone, and the rejected gas is collected through outlet 62.

The supported membrane 58 is reciprocally supported on track or guide 63. The supported gas membrane system is movable through a divider bulkhead 65 which has a passageway that is opened and closed by a closure member 67. Such closure member may be actuated to move up and down in the form of a guillotine door to open and close the passageway (not shown).

The supported gas membrane system is then moved into the adjoining desorption zone 69, and the position of the membrane system is indicated by 71 in phantom. The desorption zone is provided with a discharge 73 for the permeated or discharge gas component. A control and motive means 75 is shown mounted on the gas separating enclosure and such means move the supported gas permeable membrane system at a predetermined velocity, as well as pausing the membrane system in the respective zones or chambers for predetermined time periods.

A gas permeable membrane system is rotatably mounted so that a point thereon is cyclically moved between adjacent sorption and desorption zones or chambers, as illustrated in the view of FIG. 4. The gas separating enclosure is provided with the feed gas mixture inlet 76 for introducing the feed gas into a sorption zone 78, said zone being provided with a rejected gas outlet 80. A divider wall 82 has rotatably mounted thereon a gas permeable membrane system disc 84, and such disc is held by a disc support indicated by circular dotted line 85. The disc 84 and support 85 rotatably pass through a passageway member 86 which is mounted on the divider wall. The member 86 has a close tolerance passageway to accommodate the disc and support member, and to substantially prevent movement of gas between the adjoining zones or chambers.

A variable speed motor 88 is mounted to the gas separating enclosure, and such motor has a rotating shaft to which is keyed the disc 84 and support 85. It will be seen that a point on the disc moves at predetermined velocities from the sorption zone 78 into the adjoining desorption zone 92 where the carried gas component moves through discharge 94.

The apparatus of FIG. 5 may be employed to collect enriched gas component which substantially permeates through a membrane. A mixture is introduced through inlet 100 and contacts endless membrane 102 turning around rollers 103. The selected speed of the belt preferentially adsorbs high amounts of one component, and the amount of component which is carried by the membrane can then permeate through membrane 102 into a desorption zone 104 which is inside the periphery of the endless membrane. The permeated component may then be collected as an enriched stream through a discharge such as 105 shown in dotted line.

The illustrated embodiment includes a communicating line 106 through which rejected gas mixture passes into a second sorption zone 107. The mixture is again contacted by the moving membrane so that a component may be preferentially adsorbed thereon in accordance with the velocity selected to attain highest amounts of adsorption under non-steady-state conditions. The rejected enriched component may be collected from outlet 108.

The claims of the invention are now presented.

What is claimed is:

1. A method for separating a gas mixture containing methane and nitrogen into enriched separate fractions which includes the steps of delivering a feed gas mixture including methane and nitrogen into an enlcosed sorption zone wherein a permeable membrane system is positioned, said membrane system including at least a homopolymer of acrylonitrile membrane having a thickness less than about 1 mil, so that nitrogen may be selectively carried by said membrane under a non-steady state condition, effecting relative movement between the gas permeable membrane and the feed gas mixture to allow the nitrogen component in the mixture to preferentially move onto said gas permeable membrane relative to the methane in said mixture during a non-steady state condition which corresponds to a time period prior to a time when the carried gas attains substantially constant composition levels, obtaining methane in said sorption zone in an enriched rejected component, during the non-steady state condition, and collecting said adsorbed nitrogen component from said gas permeable membrane in a desorption zone as an enriched component.

2. A method as in claim 1 wherein said gas permeable membrane system is an endless film so that a given point in said film is continuously recycled through respective sorption and desorption zone during said non-steady state conditions.

3. A method as in claim 1 wherein said gas permeable membrane system is a supported membrane sheet which reciprocates between adjoining sorption and desorption zones at predetermined velocities and pauses in the respective zone during said non-steady state conditions.

4. A method which includes the steps of claim 1 wherein said membrane is moved into a desorption zone, and wherein a point on said moved membrane is retained during movement in said desorption zone for a time sufficient for the nitrogen component carried by said membrane to be substantially collected in said desorption zone as an enriched component.

5. A method as in claim 1 above wherein said relative movement is effected by moving the permeable membrane at a predetermined velocity.

* * * * *